United States Patent [19]

Vogel

[11] 4,156,168

[45] May 22, 1979

[54] ELECTRIC MOTOR

[75] Inventor: John D. Vogel, Parma, Ohio

[73] Assignee: Tokheim Corporation, Fort Wayne, Ind.

[21] Appl. No.: 738,357

[22] Filed: Nov. 3, 1976

[51] Int. Cl.$^2$ ............................................... H02P 7/00
[52] U.S. Cl. .................................... 318/138; 318/439; 318/254; 310/156; 310/218
[58] Field of Search ................ 310/156, 199, 216–218, 310/266, 194; 318/138, 439, 49, 254

[56] References Cited

U.S. PATENT DOCUMENTS

| | | | |
|---|---|---|---|
| 713,603 | 11/1902 | Churchward | 310/194 X |
| 2,654,037 | 9/1953 | Henter | 310/194 |
| 2,912,609 | 11/1959 | Kassner | 310/156 |
| 3,299,335 | 1/1967 | Wessels | 310/156 |
| 3,304,481 | 2/1967 | Saussele | 318/138 |
| 3,333,172 | 7/1967 | Brailsford | 318/138 |
| 3,473,069 | 10/1969 | Herbert | 318/138 |
| 3,797,106 | 3/1974 | Costello | 310/218 |
| 3,846,682 | 11/1974 | Massie | 318/138 |

Primary Examiner—Robert K. Schaefer
Assistant Examiner—M. K. Mutter

[57] ABSTRACT

A direct current electric motor including a stator assembly having a stator core of magnetic material. The core has therethrough a generally cylindrical cavity and rotatably mounted therein is a cylindrical rotor assembly. Recesses are formed in the wall of the cavity, the recesses defining therebetween motor poles. Coil bobbins are provided, the bobbins being dimensioned to be slidably received in the recesses in positions bounding respective ones of the poles and each bobbin having wound thereon a selected plurality of turns of magnet wire. The length of the stator core and rotor assembly and the number of turns can be selectively varied to provide a motor of desired torque. The bobbins may be molded and provided with integrally formed end portions which close the recesses in the wall of the cavity and provide a cavity having a smooth and continuous cylindrical surface. The motor operates from a source of direct current operating potential and may further include electronic commutating means for alternately and sequentially energizing predetermined ones of the coils in synchronism with the rotation of the rotor. The commutating means is responsive to both the rotation and position of the rotor, permits rotation of the rotor in either direction and includes circuitry which minimizes transient voltages applied to the components thereof.

19 Claims, 15 Drawing Figures

ELECTRIC MOTOR

CROSS-REFERENCE TO RELATED APPLICATIONS

The applicant is the applicant of a related application entitled "BI-DIRECTIONAL PUMP assigned Ser. No. 738,589" filed approximately at the same time as this application; both applications are assigned to the same assignee.

BACKGROUND OF THE INVENTION

The present invention relates to an electric motor and in particular to a bi-directional, direct current electric motor having solid state, electronic commutation and a core and coil configuration which permits simple alteration of motor capacity without significant alteration of the motor configuration whereby the motor is especially adapted for mass production applications requiring a variety of motors.

Small electric motors and in particular small electric motors operating from a source of direct current potential are well known and widely used. Uses for such motors range from children's toys to fan and blower motors for automobiles. For each application of such a motor, it is common practice to vary most if not all of the parameters affecting the motors design to thereby adapt the motor for its particular use or to provide a motor having a particular capacity in terms of torque, speed, and operating characteristics. It is further, common practice to provide such motors with laminated iron cores and coil windings with the coil windings being stuffed or otherwise inserted into the core, retained by means such as plastic or wooden wedges or the like and individually electrically connected to a segmented commutator. Motor cores are varied both in length and diameter and the density and wire size of coils are varied. Each motor is typically adapted by means of starting coils or the like to rotate in a single direction suited to the end use thereof.

Because of the mass usage of such motors, mass production techniques have enabled the production of such motors at relatively low cost despite the many and varied configurations. Nonetheless, there exists a need to provide a small and efficient direct current electric motor which provides simple variation of the parameters thereof whereby a single, substantially standardized motor configuration can be provided to fulfill varied capacity requirements.

SUMMARY OF THE INVENTION

Broadly, the invention is an electric motor which includes a stator assembly including a stator core of magnetic material having therethrough a generally cylindrical cavity. A cylindrical rotor assembly is rotatably mounted coaxially in the cavity. A plurality of pairs of recesses are formed in the wall of the cavity such that they define therebetween magnetic pole elements. A plurality of coil bobbins having wound thereon a selected plurality of turns of magnet wire are dimensioned to be slidably received in the recesses in positions bounding respective ones of the magnetic pole elements. Means are provided for fixedly securing the bobbins in their received positions.

A source of operating potential is provided and commutating means are coupled between the coils and the source for alternately and sequentially energizing predetermined ones of the coils in synchronism with the rotation and position of the rotor. In one embodiment the commutating means includes a solid state, electronic circuit which includes therein circuitry responsive to the counter voltage generated in the coils by the rotor for causing switching of the commutating means.

In one specific embodiment of the invention, the commutating means includes a free running multivibrator having a predetermined free running frequency several times lower than the operation frequency of the motor such that it generates a magnetic field in the stator assembly in response to switching thereof to effect starting of the motor when the rotor is at rest.

In yet another specific embodiment of the invention, the motor of the present invention is used in conjunction with a driven device such as a pump, the means for rotatably mounting the rotor comprising portions of the driven device.

It is therefore an object of the invention to provide an improved electric motor.

It is another object of the invention to provide such a motor having maximum simplicity in its assembly.

Still another object of the invention is to provide such a motor configured to enable production of electric motors having a wide range of capacities with a minimum of alteration of the parameters of the motor.

Yet another object of the invention is to provide such a motor incorporating a solid state switching circuit to effect commutation.

Another object of the invention is to provide such a motor having an electronic commutation circuit responsive to the rotation and rotational position of the rotor.

Still another object of the invention is to provide a motor incorporating pole coils wound on bobbins, the bobbins being slidably received in the stator core.

Still another object of the invention is to provide such a motor having a rotor and a stator core and pole coils wherein the length dimensions thereof are altered to provide motors of different capacity.

Still another object of the invention is to provide such a motor that is bi-directional in rotation.

Another object of the invention is to provide such a motor wherein the coil bobbins are retained in position by pole shoe elements.

Yet another object of the invention is to provide a motor having molded coil bobbins which close the coil receiving recesses and provide of smooth, continuous cavity wall.

Still another object of the invention is to provide such a motor having asymetrical pole shoes to increase starting torque characteristics of the motor.

Another object of the invention is to provide such a motor which incorporates a permanent magnet rotor having alternating north and south segments of different circumferential dimension to improve starting torque characteristics of the motor.

Yet another object of the invention is to provide such a motor incorporating a solid state commutator circuit responsive to the counter voltage generated in the pole coils to effect synchronous switching thereof with rotation of the motor rotor.

Another object of the invention is to provide a solid state commutator circuit which minimizes the exposure of the components thereof to transient voltages.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings wherein.

DESCRIPTION OF THE SPECIFIC EMBODIMENT

Referring now to the drawings, there is disclosed in FIG. 5, a stator core assembly indicated generally by numeral 100 and a rotor assembly including a permanent magnet rotor 102 (to be described in detail below) a rotor web 104, and shaft 106. The stator assembly 100 includes a stator core 108 of generally cylindrical rotor cavity 110 having an axis 112.

Core 108 is formed from a plurality of core laminations 114, each lamination 114 being of substantially identical axial cross-section. As can best be seen in FIGS. 2 and 3, the number of laminations 114 can be selectively varied to provide a core 108 of selected axial length.

Figures 5, 6:
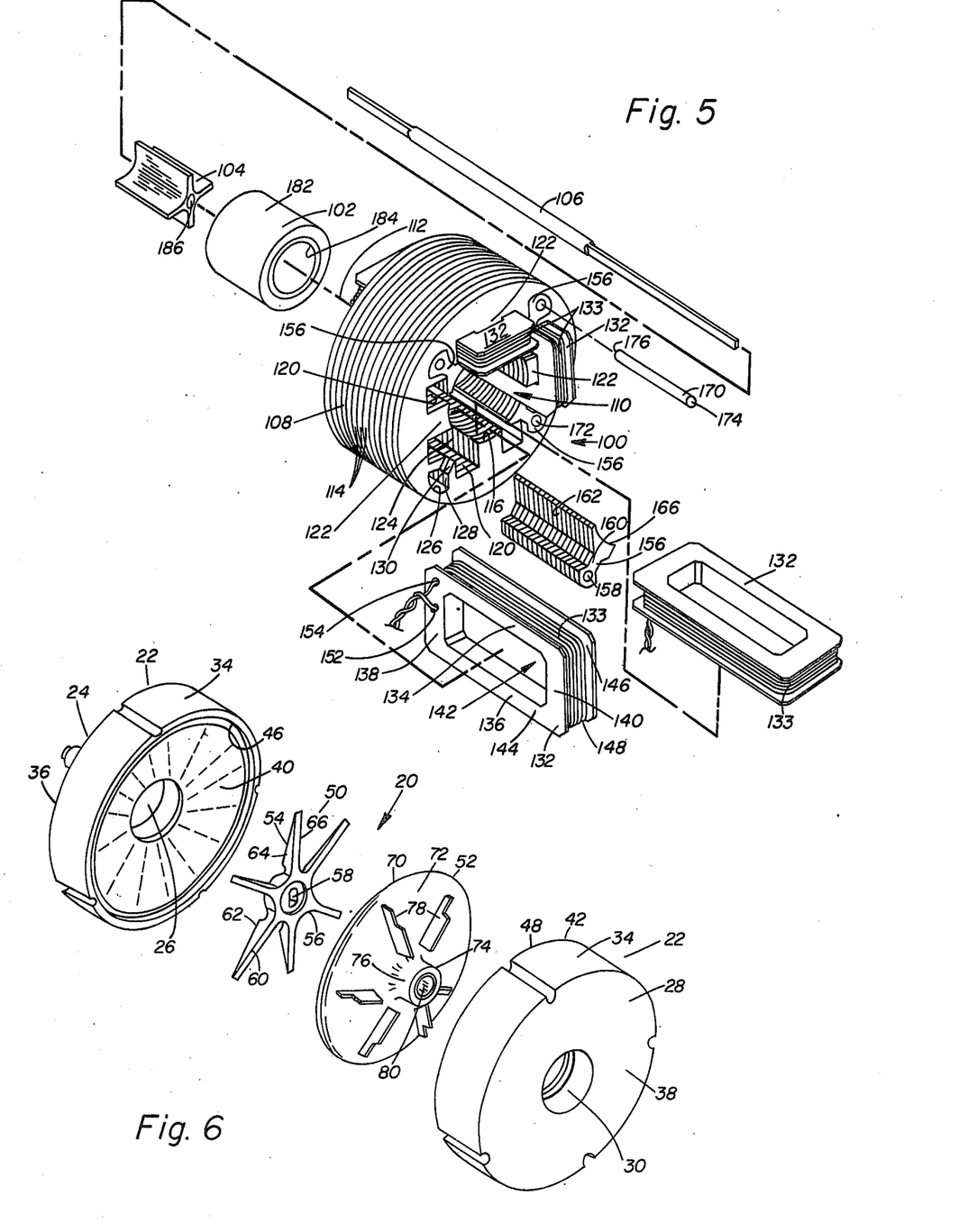
FIG. 5 is a perspective and partially exploded view of the improved motor structure of the invention.
FIG. 6 is a perspective and exploded view of a pump structure used with the invention.
Figure 7:
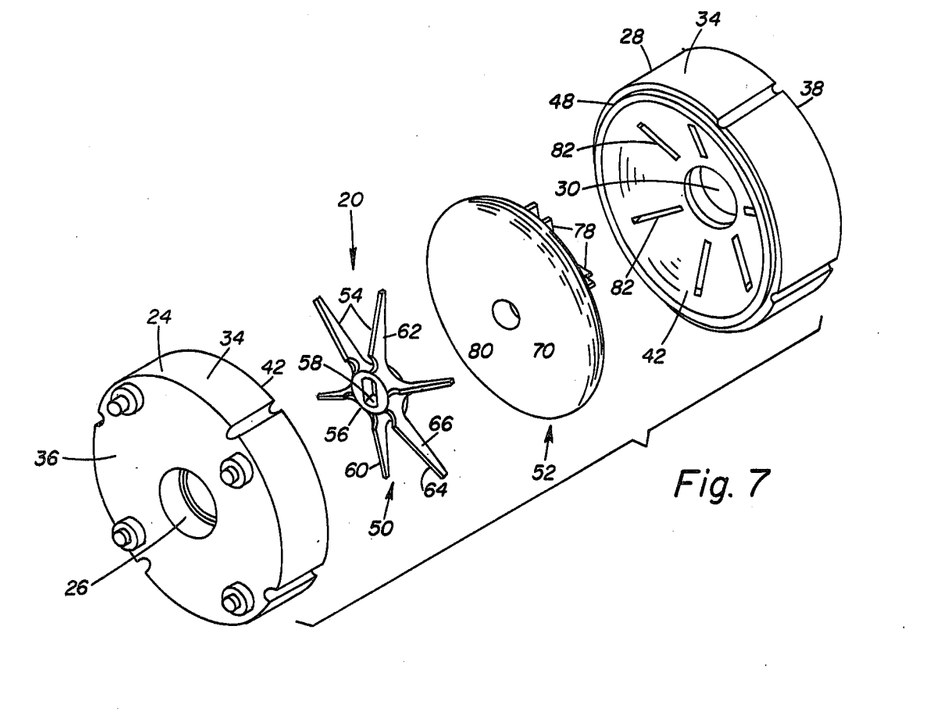
FIG. 7 is a perspective and exploded view of the pump structure as used with the invention showing the opposite side of the elements of the pump shown in FIG. 6.
Figure 8:
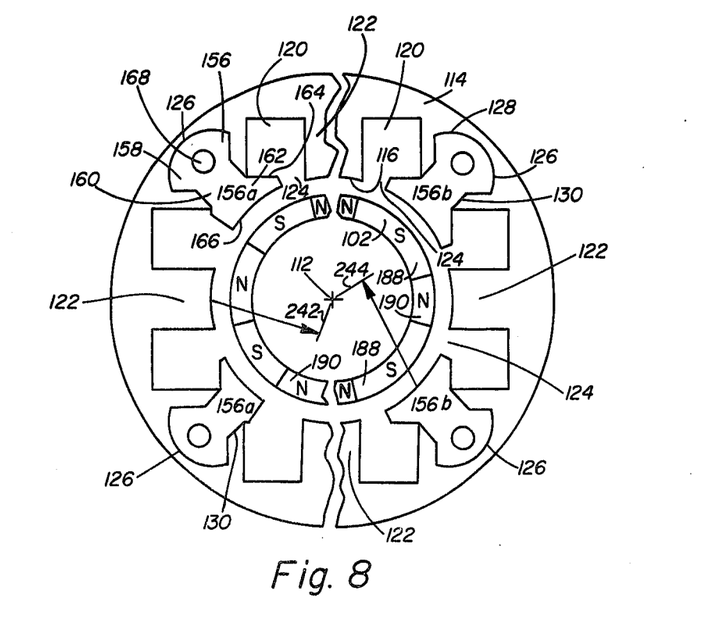
FIG. 8 is a perspective and partially exploded view of the improved motor structure of the invention, diagrammatically illustrating the starting torque characteristics thereof.

Referring specifically to FIGS. 5 and 8, core 108 has formed in the wall 116 of cavity 110 a plurality of coil recesses as at 120, recesses 120 being provided in pairs 120 and extending in directions parallel to axis 112, whereby each pair of recesses 120, defines therebetween a pole element 122 which extends radially inwardly toward axis 112.

Recesses 120 have a generally rectangular configuration in axial cross-section, and the ends 124 thereof disposed inwardly toward axis 112 are open.

Formed between each pair of coil recesses 120 is a pole shoe recess 126. Recesses 126 again extend generally parallel to axis 112 and extend generally radially outwardly with respect to cavity wall 116. Recesses 126 are provided with an enlarged retaining portion 128 and a relatively smaller neck portion 130. A plurality of coil bobbins 132 are provided, each bobbin 132 having a generally rectangular configuration including side portions 134, 136, end portions 138, 140, a central opening 142 and peripheral flanges 144, 146 laterally spaced-apart to define therebetween a circumferential recess 148.

Opening 142 is again generally rectangular and bobbins 132 are dimensioned such that they can be inserted into cavity 110 and radially slidably positioned in a selected pair of recesses 120, in a position wherein they bound the corresponding pole element 122. The magnetic pole element 122 extends through the central opening 142. The lateral spacing between side portions 134, 136 is generally constant for motors of any selected capacity (torque) while the length of the side portions 134, 136 can be selectively varied to provide bobbins of different lengths as can best be seen in FIGS. 2 and 3.

A plurality of turns of magnet wire are wound circumferentially on the bobbins 132, the turns being received in the peripheral recess defined by flanges 144, 146 and forming pole coils 133. The respective ends of the turns exit from bobbins 132 through appropriate holes 152, 154, formed in the ends 138 of the bobbins 132. The number of turns of magnet wire wound on the bobbins 132 can be selectively altered to provide pole coils 133 of selected strength.

In one embodiment of the invention, the coils 133 can be series wound in pairs using a single continuous wire. In this instance, the common connection is treated as a center tap whereby three wire connections rather than four are required in the interconnection of the coils 133 with the commutating means described in detail below.

A plurality of pole shoes 156 are provided, pole shoes 156 including a retaining portion 158, a neck portion 160, and a shoe portion 162. Retaining portion 158 and neck portion 160 have cross-sections complementary to the enlarged and neck portions, respectively, of recesses 126 whereby shoes 156 can be slidably received into recesses 126 in a direction generally parallel to axis 112. It will be observed that by reason of the shape of the retaining and neck portions of the pole shoes 156, the pole shoes are radially, interlockingly engaged with the core 108. Preferably, pole shoes 156 are dimensioned such that they can be press fitted into the recesses 126 thereby frictionally maintaining them in their installed positions.

As can best be seen in FIG. 8, the shoe portions 162 of pole shoes 156 include a radially outwardly disposed surface 164 which at least partially overlies the open end 124 of recesses 120. Thus, when coils 133 have been positioned in the recesses 120 such that they bound the pole elements 122, the pole shoes 156 can be inserted into their respective recesses 126 and the radially inwardly disposed surfaces 164 thereof will positively retain the coils 133 in their installed positions. It will further be observed that the radially inwardly disposed surfaces 166 of pole shoes 156 are coextensive with the cylindrical cavity 110 such that these radially inwardly disposed surfaces 166 define a portion of the wall 116 of the cylindrical cavity 110.

Each pole shoe 156 may further be provided with a small cylindrical hole 168 extending through the head portion 158 thereof. Holes 168 frictionally receive therein suitable pins 170. Pins 170 function to secure the individual laminations 171 of the pole shoes together prior to their insertion into the core 108. Preferably, pins 170 have a length dimension slightly shorter than the assembled length dimension of the pole shoes 156 whereby, when pins 170 are inserted therethrough, there remain small, cylindrical indentations as at 172 defined by the ends 174, 176 and the end portions of holes 168. These indentations 172 provide a means for aligning externally mounted driven devices, such as the fuel pump illustrated with the motor core assembly 110.

Referring still to FIGS. 5 and 8, rotor 102 may be fabricated with an outer shell 182 made from a suitable ceramic magnet material formed in the shape of a hollow cylinder. A supporting shell 184 is frictionally received coaxially within the magnetic shell 182, shells 182 and 184 forming the hollow, cylindrical rotor 102. As best seen in FIG. 8, magnetic shell 182 is selectively magnetized by conventional means to have a plurality of magnetic sectors 188, 190 of alternating north and south polarity.

Frictionally received within shell 184 is web 104 which may be fabricated from a suitable material such as nylon, web 104 functioning as the hub for rotor 102. A cylindrical hole 186 is formed through the axial center of web 104 and a rotor supporting shaft 106 is frictionally received therein. Shaft 106 is substantially longer than core assembly 100 or rotor 102 to permit coupling of the rotor to a driven device such as the pump more fully described in the above-identified related application. Further, shaft 106 may be rotatably mounted in the bearings of the externally driven device such as the pump thereby obviating the need for separate bearing assemblies for the rotor itself.

Referring now particularly to FIGS. 9 through 12, there is illustrated an electronic commutating means 190. Commutating means 190 comprises generally a multivibrator circuit 192.

Figure 9:
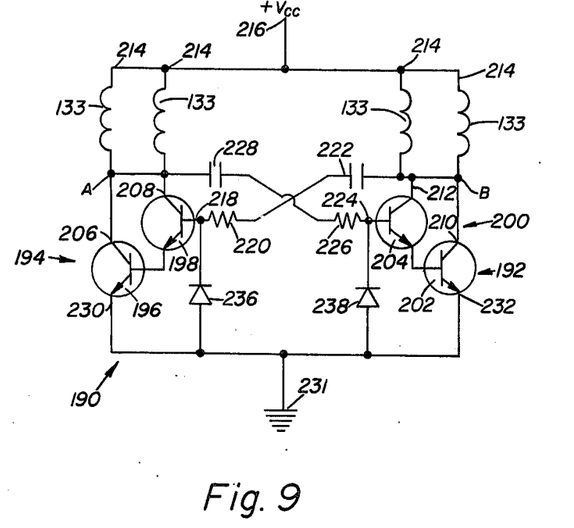
FIG. 9 is a circuit diagram of the electronic commutation circuitry of the invention.

Circuit 192 includes a first switching circuit 194 including a "Darlington" connected pair of transistors 196, 198. A second switching circuit 200 similarly includes a "Darlington" connected pair of transistors 202, 204. The commonly connected collectors 206, 208 of transistors 196, 198 are connected to oppositely disposed pairs of coils 133. Similarly, the commonly connected collectors 210, 212 of transistors 202, 204, respectively are connected to the other oppositely disposed pair of coils 133. The opposite ends 214 of coils 133 are connected in common to a source of direct current operating potential 216 such as, for example, a battery. The base 218 of transistor 198 is connected through a series connected resistor 220 and capacitor 222 to collectors 210, 212. Base 224 of transistor 204 is connected through series connected resistor 226 and capacitor 228 to collectors 206, 208. Emitters 230, 232 of transistors 196 and 202, respectively, are connected in common to ground 231. Suitable clamping diodes 236, 238 are connected between bases 218 and 224 and ground, respectively. Circuit 192 will be recognized as a conventional free running multivibrator with coils 133 being connected in the load circuits thereof. The frequency of multivibrator circuit 192 is determined by the values of capacitors 222, 228 and resistors 220, 226. The values are selected such that the square wave output of the circuit has a frequency of oscillation or switching lower than the speed of rotation of rotor 102 at normal operating speeds, with one revolution being considered as one cycle.

Under these conditions it will be observed that coils 133 will be alternately sequentially, and repetitively energized in response to switching of the multivibrator circuit 192. This will in effect generate a magnetic field between the stator assembly 100 and rotor 102 and changing thereof to effect rotation of the rotor.

As the speed of rotation of the rotor increases, the magnetic sectors 188, 189 of rotor 102 will begin generating counter voltages in the coils 133 with magnitudes of the counter voltages increasing with the speed of the rotor, and in synchronism with the movement of the magnetic sectors 188, 189 past poles 122.

Figure 10:
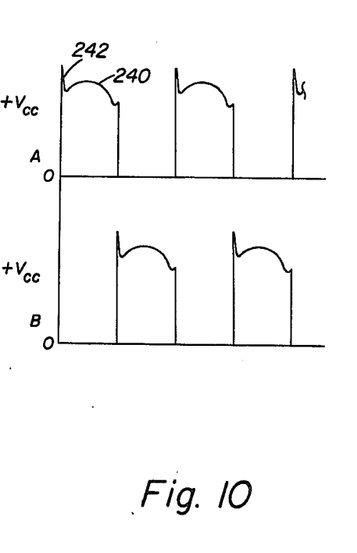
FIG. 10 is a diagrammatic illustration of the wave form generated in the commutating means of the invention.
Figure 11:
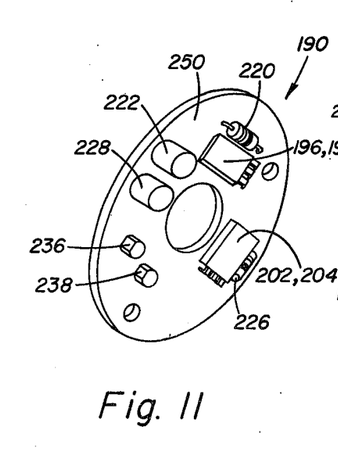
FIG. 11 is a perspective view of the circuit board of the invention on which the commutation circuitry is mounted as shown in FIGS. 1 through 3.

These counter voltages, upon reaching a sufficient magnitude, will override the normal switching cycle of the multivibrator circuit 192 produced by the resistor-capacitor networks thereof. This in turn will cause the multivibrator circuit 192 to begin switching in precise synchronism with rotation of the motor rotor 102. The actual voltages appearing at points A and B of circuit 192 will be as illustrated in FIG. 10, the values "Va, Vb" being voltages normally appeaing at terminals A and B when circuit 192 is switching under the influence of the resistor-capacitor circuits. Superimposed upon this simple square wave voltage are the counter voltages as at 240 which include a preceeding spike portion as at 242. Under these conditions, the rotor will continue to accelerate until it attains a normal equilibrium speed established by the motor parameters and external load. It should be noted that the wave form generated by the multivibrator circuit 192 and counter voltages 240 will be identical irrespective of the direction of rotation of rotor 102. Therefore the motor will operate in either direction. The actual direction of rotation will be determined either by the position of rotor 102 when the motor is activated or by the influence of an external driven device.

Referring again to FIG. 8, pole shoes 156 may be fabricated with an asymmetrical configuration as at 156a. This asymmetrical configuration of the pole shoes will distort the magnetic flux pattern extending between the poles 122 and rotor 102 whereby the effective torque between the stator assembly 100 and rotor 102 will act along a lever arm 242 offset from axis 112. In this embodiment, it will be observed that the magnetic sectors 188, 189 of rotor 102 are substantially identical in circumferential dimension.

In the alternative, the pole shoes 156 can be fabricated with symmetrical cross-sections as at 156b. In this configuration, the magnetic sectors 188, 189 of rotor 102 are formed of unequal or asymmetrical circumferential lengths. This again causes a distortion in the magnetic field between the stator assembly 100 and rotor 102. This distortion in turn causes the force vector between the stator 100 and rotor 102 to operate along a lever arm 244 offset from the axis 112.

In both instances, both with the asymmetrical pole shoe 156a or the asymmetrical magnetic sectors of rotor 102. The starting torque of the motor is substantially improved.

Figure 1:
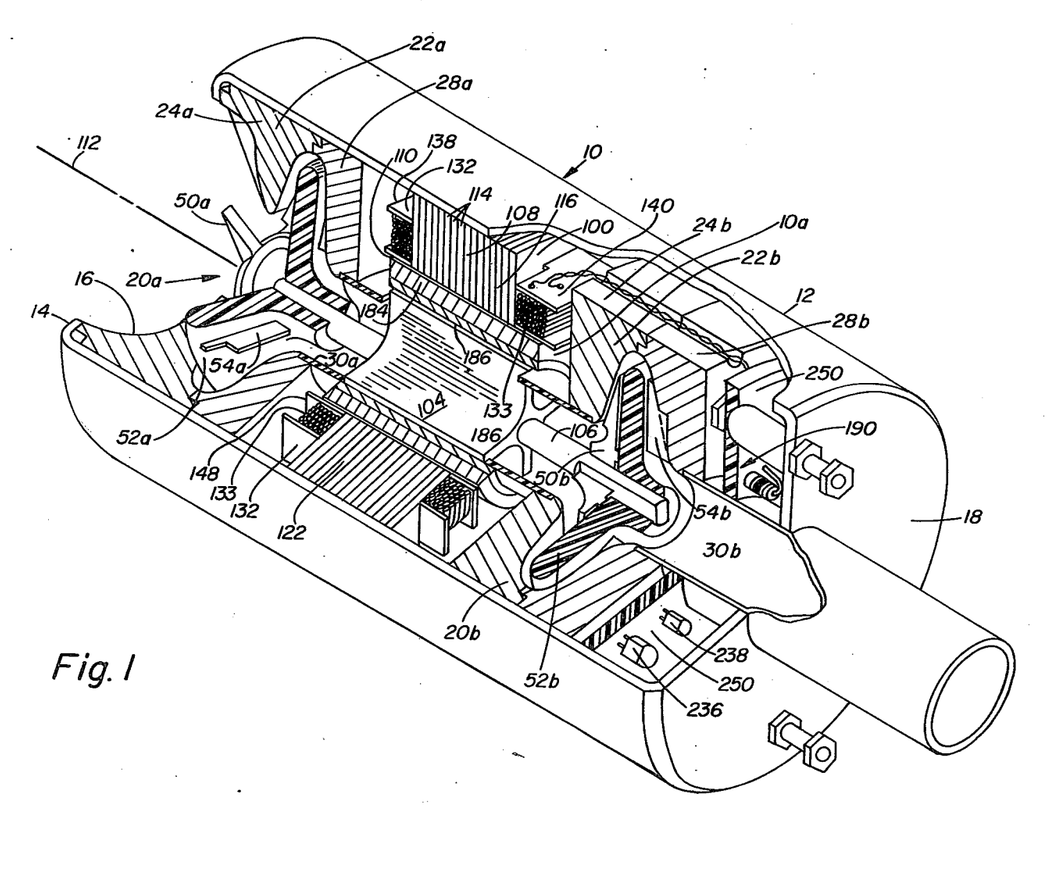
FIG. 1 is a perspective view, partially broken away, of the improved motor and improved commutation circuitry shown in combination as with a motor driven pump.
Figure 2:
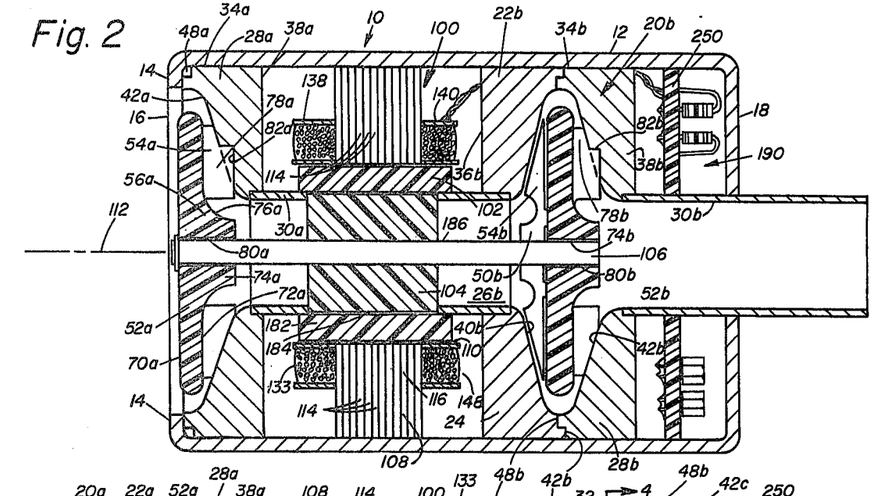
FIG. 2 is a cross-sectional view taken along a plane which includes the motor shaft axis of a single state motor driven pump, illustrating the improved motor and improved commutation electronics of the invention.
Figures 3, 4:
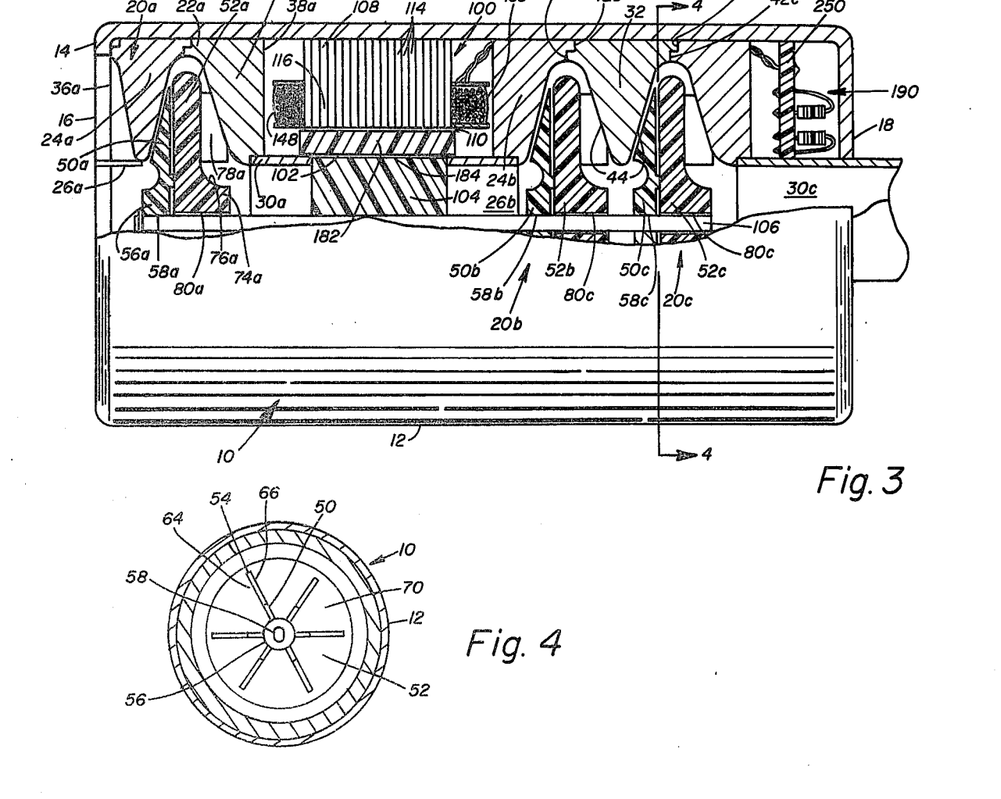
FIG. 3 is a side view, partially broken away of the improved motor of the invention showing the improved motor, the improved commutation circuit of the invention and three separate stages of a fuel pump.
FIG. 4 is a cross-sectional view of the motor pump combination illustrated in FIG. 3 taken substantially along the section line 4—4.

The entire commutating means 190 may be mounted on a single circular circuit board 250 which in turn is mounted coaxially with respect to the stator assembly 100 in a common housing with both the motor and the commutating means being mounted in a singular casing of constant and uniform diameter irrespective of the motor capacity as can be seen in FIGS. 2 and 3 wherein the motor is used in conjunction with the pump and as more fully described in the above-identified related application. All of the elements of the circuit 192 are compactly mounted on the circuit board 250 and in the case of the pump shown on FIGS. 1, 2 and 3, cooling of the components may be effected by permitting fluid to engulf the circuit board 250. The terminal ends of the coil windings can be connected directly to appropriate terminals on the circuit board 250.

Figure 12:
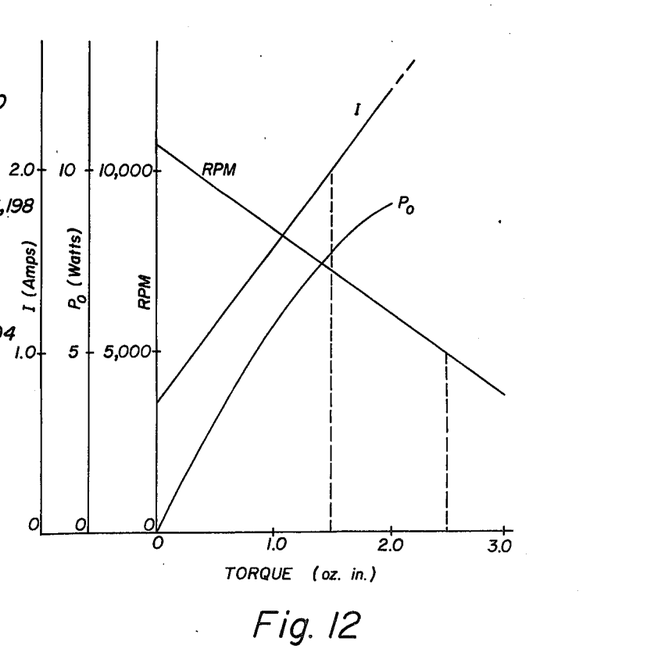
FIG. 12 is a chart showing the performance characteristics of the improved motor structure of the invention.

Referring now to FIG. 12, there is illustrated a typical set of characteristic curves for a motor fabricated in accordance with the present invention showing the torque relationship with respect to speed, power, and current. Those skilled in the art will recognize the motor characteristics as being similar to those of an ordinary brush type PM electric motor.

Figure 15:
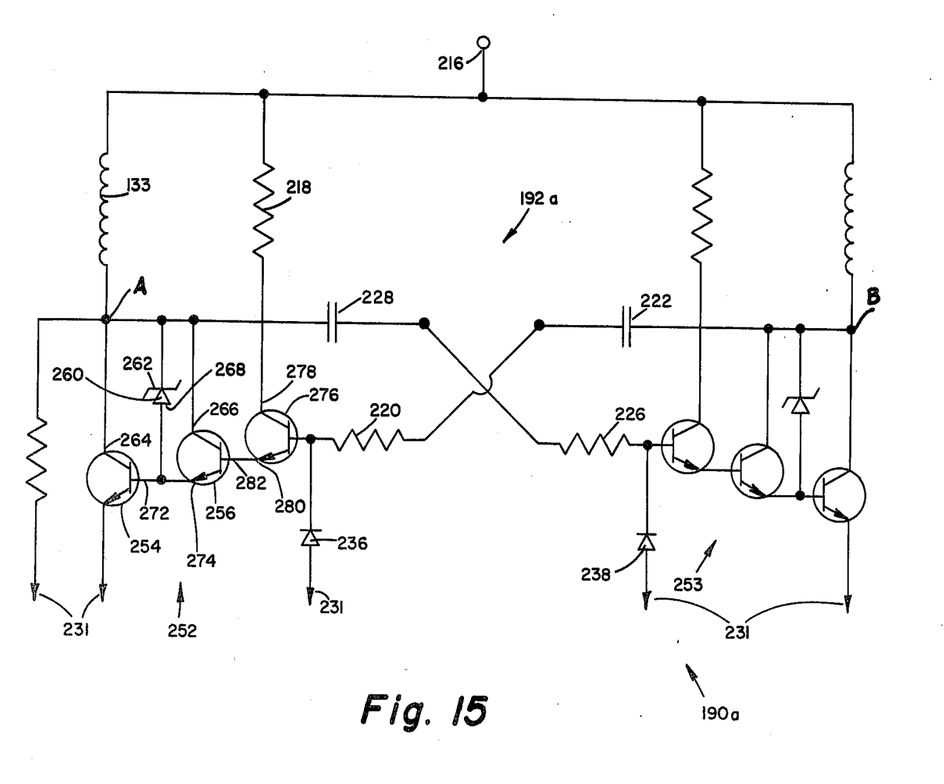
FIG. 15 is a circuit diagram of an alternative electronic commutation circuit having improved tolerance to transient voltages.

It will further be observed that operation of the motor is bi-directional, that is, the motor will operate identically for both clockwise or counter-clockwise rotation and is ideally suited for applications requiring bi-directional movement, in applications where either direction of rotation is permitted, or in applications wherein an external driven device will itself determine the direction of rotation. This characteristic further reduces the cost of the motor by obviating the need for starting windings and the like. Referring now to FIG. 15, there is illustrated an alternative electronic circuit 192a for use as commutating means 190, circuit 192a again being a free running multivibrator which includes first and second switching circuits 252, 253. Switching circuit 252 includes "Darlington" connected transistors 254, 256 connected between ground 231 and motor windings 133 (illustrated as a single winding in FIG. 15). As zener diode 260 has its cathode 262 connected to the commonly connected collectors 264, 266 of transistors 254, 256, and the anode 268 of zener diode 260 is connected to the base 272 and emitter 274 of transistors 254, 256, respectively. Thus connected, zener diode 260 shunts excess transient voltages that might otherwise be applied across the junctions of transistors 254, 256. Switching circuit 252 further includes a control transistor 276 having its collector 278 connected to source 216 through a resistor 218. The emitter 280 of transistor 276 is connected directly to the base 282 of transistor 256. Terminals A and B are also provided in the circuit of FIG. 15. Terminal A is connected through a starting resistor 257 to ground 231 as is inherent with the description herein with regard to FIG. 9.

Switching circuit 253 is identical to circuit 252 and circuits 252, 253 are cross-coupled to complete a free-running multivibrator as previously described. The advantage of modified circuit 192a is the reduction or limiting of transient voltages applied to the "Darlington" connected pairs of transistors and, by connecting transistor 276 and its counterpart directly to source 216 through resistor 218, and similarly connecting the corresponding transistor of switching circuit 253 thereto, the maximum of voltage applied across the collector 278 and emitter 280 of transistor 276 is limited to 12 volts. These two factors cooperate to significantly reduce the transient voltages to which the components of the circuit are exposed thereby providing a more stable circuit and reducing the tolerances required for the components thereof.

Figure 13:
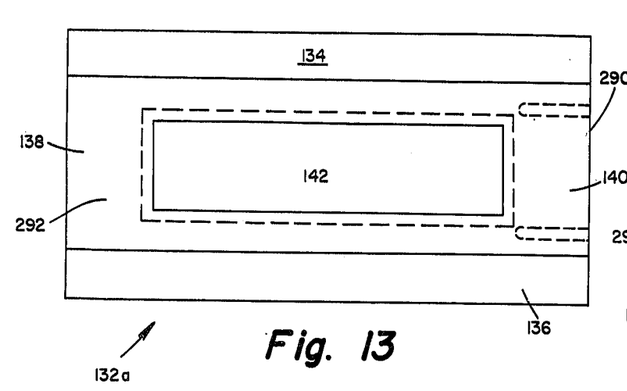
FIGS. 13 and 14 are end and bottom plan view of an alternative configuration of a coil bobbin for use in the invention.
Figure 14:
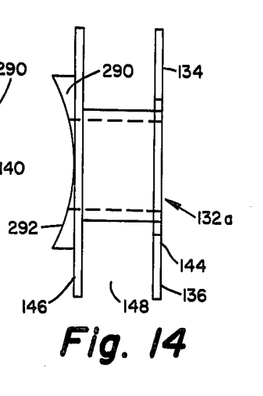

Referring now to FIGS. 13, and 14, there is illustrated an alternative embodiment 132a of a coil bobbin 132. Bobbin 132a again has a generally rectangular configuration including side portions 134, 136, end portions 138, 140, a central opening 142 and peripheral flanges 144, 146 laterally spaced-apart to define therebetween a circumferential recess 148. Bobbins 132a are further provided with a molded cavity surface portion 290. Portion 290 has a generally arcuate surface 292 which is shaped such that, when the bobbin 132a is fitted about the pole portion 122, the arcuate surface 292 completely closes the open ends of recesses 124 and forms therewith and with the pole shoes, a smooth continuous cylindrical cavity for the rotor 102. This configuration of the bobbin is especially advantageous when the motor is used in a "flow-through" application such as in a fuel pump where fluid is passing through the cavity because the smooth cylindrical cavity reduces viscous drag between the rotor and the stator of the motor.

Because the motor does not incorporate the typical segmented copper commutator required in conventional direct current motors, a major wear and expense factor in such motors is eliminated. Further, elimination of the segmented commutator produces a motor that is "sparkless" whereby it is safe for use in hazardous environments such as in the presence of voltile or explosive fuels and vapors. Efficiency of the motor is comparable to conventional commutator type motors.

Further, the unique arrangement of the coil assemblies utilizing bobbins of selectively different lengths, the series wound pairs of coils and "center tap" connection, and the provision of open ended coil recesses provides a motor which is ultimately simple in assembly, this assembly obviating the need for conventional "stuffing" of coil windings and reduction in wiring. It further enables simple random winding of the pole coils on the bobbins prior to their assembly and facilitates handling thereof between winding of the coils and their insertion. The coil bobbins are in turn simple and easily secured in position by the pole shoes 156. Motors of the configuration of the present invention have for example been found highly satisfactory for use in a submersible fuel pump as described in the above-identified related application.

While there have been described above the principles of this invention is connection with specific apparatus, it is to be clearly understood that this description is made only by way of example and not as a limitation to the scope of the invention.

What is claimed is:

1. An electric motor comprising a stator assembly including a stator core having a cavity extending therethrough, said cavity having a wall, a rotor assembly, and means for rotatably mounting said rotor assembly in said cavity, a plurality of pairs of coil recesses formed in said wall of said cavity and extending in directions substantially parallel to the axis of said cavity, each pair of said coil recesses defining therebetween a magnetic pole element, a plurality of coil bobbins dimensioned to received in said coil recesses, each of said coil bobbins having wound thereon a selected number of turns of wire to form a pole coil, means for retaining said coil bobbins in said received positions, said rotor being selectively magnetized to have a plurality of magnetic sectors of alternate polarity, a source of direct current operating potential, and commutating means for alternately and sequentially energizing predetermined ones of said pole coils in synchronism with the rotation of said rotor, said commutating means including a solid state switching circuit connected between ground and said pole coils, said switching circuit including a series connected resistor and capacity timing circuit responsive to the self-induced counter voltage in said pole coils for causing said switching circuit to switch in response to the rotational movement and position of said rotor as sensed by said pole coils.

2. The motor of claim 1 wherein said coil recesses have generally flat, parallel sides, the ends of said coil recesses disposed radially inwardly toward the axis of said cavity being open, said coil bobbins having generally straight sides and ends and an open center, said coil bobbin sides having cross-sections complementary to the cross-sections of said coil recesses, said open center having a shape complementary to the cross-section of said magnetic pole elements.

3. The motor of claim 1 wherein said rotor assembly includes means for radially offsetting from the axis of said rotor a force vector generated between said magnetic pole elements and said rotor.

4. The motor of claim 1 further including a plurality of pole shoes extending from said cavity wall between adjacent ones of said coil recesses of said adjacent pairs of coil recesses, said pole shoes having opposite ends, one of said opposite ends being adjacent said cavity axis and other of said opposite ends being remote from said cavity axis, said coil recesses having opposite open and closed ends, said retaining means including a retaining element at said one end of said pole shoe, said retaining element overlying at least a portion of said open ends of said coil recesses, whereby said retaining elements maintain said coil bobbins in said positions bounding said magnetic pole elements.

5. The motor of claim 2 further including a plurality of pole shoes extending from said cavity wall between adjacent ones of said coil recesses of said adjacent pairs of coil recesses, said pole shoes having opposite ends, one of said opposite ends being adjacent said cavity axis and other of said opposite ends being remote from said cavity axis, said coil recesses having opposite open and closed ends, said retaining means including a retaining element at said one end of said pole shoe, said retaining element overlying at least a portion of said open ends of said coil recesses, whereby said retaining elements maintain said coil bobbins in said positions bounding said magnetic pole elements.

6. The motor of claim 4 further including a plurality of pole shoe recesses formed in said wall of said cavity between adjacent ones of said coil recesses of said adjacent pairs of coil recesses, said pole shoe recesses extending in directions substantially parallel to said coil recesses, each of said pole shoes having a mounting portion adjacent said other end and a shoe portion adjacent said one end, said pole shoe recesses and said mounting portions having complementary and radially interlocking cross-sections, said shoe portions having cavity surfaces conforming to the circumferential surface of said cavity.

7. The motor of claim 1 wherein said stator core includes a selected plurality of substantially identical laminations longitudinally stacked, each of said coil bobbins having opposite sides, said opposite sides being of selected lengths substantially equal to said length of said stator core, said selected length of said stator core, and said number of turns of said magnet wire wound on said coil bobbins determining torque of said motor whereby said torque of said motor can be selectively varied.

8. The motor of claim 3 wherein said radially offsetting means includes a hollow cylinder of magnetic material selectively magnetized to include equal numbers of alternating north and south linear segments, adjacent ones of said segments being of unequal circumferential length.

9. The motor of claim 6 further including means for radially offsetting from the axis of said rotor a force vector generated between said magnetic pole elements, said shoe portions of said pole shoes and said stator rotor.

10. The motor of claim 9 wherein said radially offsetting means includes a hollow cylinder of magnetic material selectively magnetized to include an equal number of alternating north and south linear segments, said shoe portions of said pole shoes having asymmetrical cross-sections in a direction parallel to the axis of said cavity.

11. An electric motor comprising a stator assembly including a stator core of magnetic material having a cavity extending therethrough, a rotor assembly and means for rotatably mounting said rotor assembly coaxially in said cavity, said stator assembly including a plurality of magnetic poles extending radially inwardly toward the axis of said cavity, each said pole being bounded by a magnetic coil, said rotor being selectively magnetized to have a plurality of magnetic sectors of alternate polarity, a source of direct current operating potential, commutating means for alternately and sequentially energizing predetermined ones of said coils in synchronism with the rotation of said rotor, said commutating means including a solid state switching circuit connected between ground and said coils, said switching circuit including a series connected resistor and capacitor timing circuit and a free-running multi-vibrator having a predetermined free-running frequency, and a biasing circuit coupled to said coils, said biasing circuit being responsive to said counter voltage to cause switching of said multivibrator in synchronism with the rotation and rotational position of said rotor when said rotor is rotating in a clockwise or counter-clockwise direction and at a frequency different from said free-running frequency, said switching circuit including alternately conductive first and second switching elements, each of said switching elements being connected to preselected different ones of said coils, predetermined ones of said coils being energized in response to conductive states of said first and second switching elements, respectively, the electric field generated by said coils in response to the selected energization of alternate ones of said coils being a changing magnetic field, rotational torque being applied to said rotor by said changing magnetic field, said biasing circuit including at least one timing circuit having a predetermined time constant and being coupled to said switching elements and said coils, said free-running frequency being determined by said time constant, said time constant being altered by said counter voltage, said switching elements being first and second transistors, respectively, said transistors having their collector-emitter circuits connected electrically in series with the said predetermined ones of said coils, there being one said timing circuit connected between the collector of said first transistor and the base of said second transistor and including a series connected resistor and capacitor, and a second said timing circuit connected between the collector of said second transistor and the base of said first transistor and including a series connected resistor and capacitor, said first and second transistors being rendered conductive in response to said counter voltage generated in said predetermined ones of said coils connected thereto, respectively, said first and second timing circuits being shunted in response to said conductive states of said second and first transistors, respectively, whereby said frequency of said multivibrator is altered in response to said counter voltage.

12. The motor of claim 11 further including a zener diode connected electrically in parallel with the collector and base of said first and second transistors, each said switching circuit first including a control transistor having its collector-emitter circuit connected between said coils and the control element of respective ones of said first and second transistors, the base of said control transistor being connected to said biasing circuit.

13. An electric motor comprising a stator assembly including a stator core having a cavity extending therethrough, a rotor assembly and means for rotatably mounting said rotor assembly in said cavity, said stator assembly including a plurality of magnetic poles, said rotor being selectively magnetized to have a plurality of magnetic sectors of alternate polarity, a source of direct current operating potential, commutating means for alternately and sequentially energizing predetermined ones of said poles in synchronism with the rotation of said rotor, said commutating means including a solid state switching circuit connected between ground and said poles, said switching circuit including a series connected resistor and capacitor timing circuit responsive to the self-induced counter voltage in said poles for causing said switching circuit to switch in response to the rotational movement and position of said rotor with respect to said poles.

14. The motor of claim 13 wherein said switching circuit includes a free-running multivibrator having a predetermined free-running frequency and a biasing circuit coupled to said poles, said biasing circuit being responsive to said counter voltage to cause switching of said multivibrator in synchronism with the rotation and rotational position of said rotor when said rotor is rotating in a clockwise or counter-clockwise direction and at a frequency different from said free-running frequency.

15. The motor of claim 14 wherein said timing circuit has a predetermined time constant, said free-running frequency being determined by said time constant, said time constant being altered by said counter voltage.

16. The motor of claim 13 wherein said switching circuit includes alternately conductive first and second switching elements, each of said switching elements being connected to preselected different ones of said poles, predetermined ones of said poles being energized in response to conductive states of said first and second switching elements, respectively, the electric field generated by said poles in response to the selected energization of alternate poles being a changing magnetic field, rotational torque being applied to said rotor by said changing magnetic field.

17. The motor of claim 13 wherein said switching circuit includes a first and second transistors, said transistors having their collector-emitter circuits connected electrically in series with the said predetermined ones of said poles, there being one said timing circuit connected between the collector of said first transistor and the base of said second transistor, and a second said timing circuit connected between the collector of said second transistor and the base of said first transistor, said first and second transistors being rendered conductive in response to said counter voltage generated in said predetermined ones of said poles connected thereto, respectively, said first and second timing circuits being shunted in response to said conductive states of said second and first transistors, respectively, whereby said frequency of said multi-vibrator is altered in response to said counter voltage.

18. The motor of claim 13 wherein said rotor assembly includes means for radially offsetting from the axis of said rotor a force vector generated between said magnetic pole elements and said rotor.

19. The motor of claim 18 wherein said radially offsetting means includes a hollow cylinder of magnetic material selectively magnetized to include an equal number of alternating north and south linear segments, adjacent ones of said linear segments being of unequal circumferential length.

* * * * *